Nov. 14, 1961 S. F. BRIGHT 3,008,284
GRASS RECOVERING ATTACHMENT FOR ROTARY MOWER
Filed June 16, 1959 2 Sheets-Sheet 1
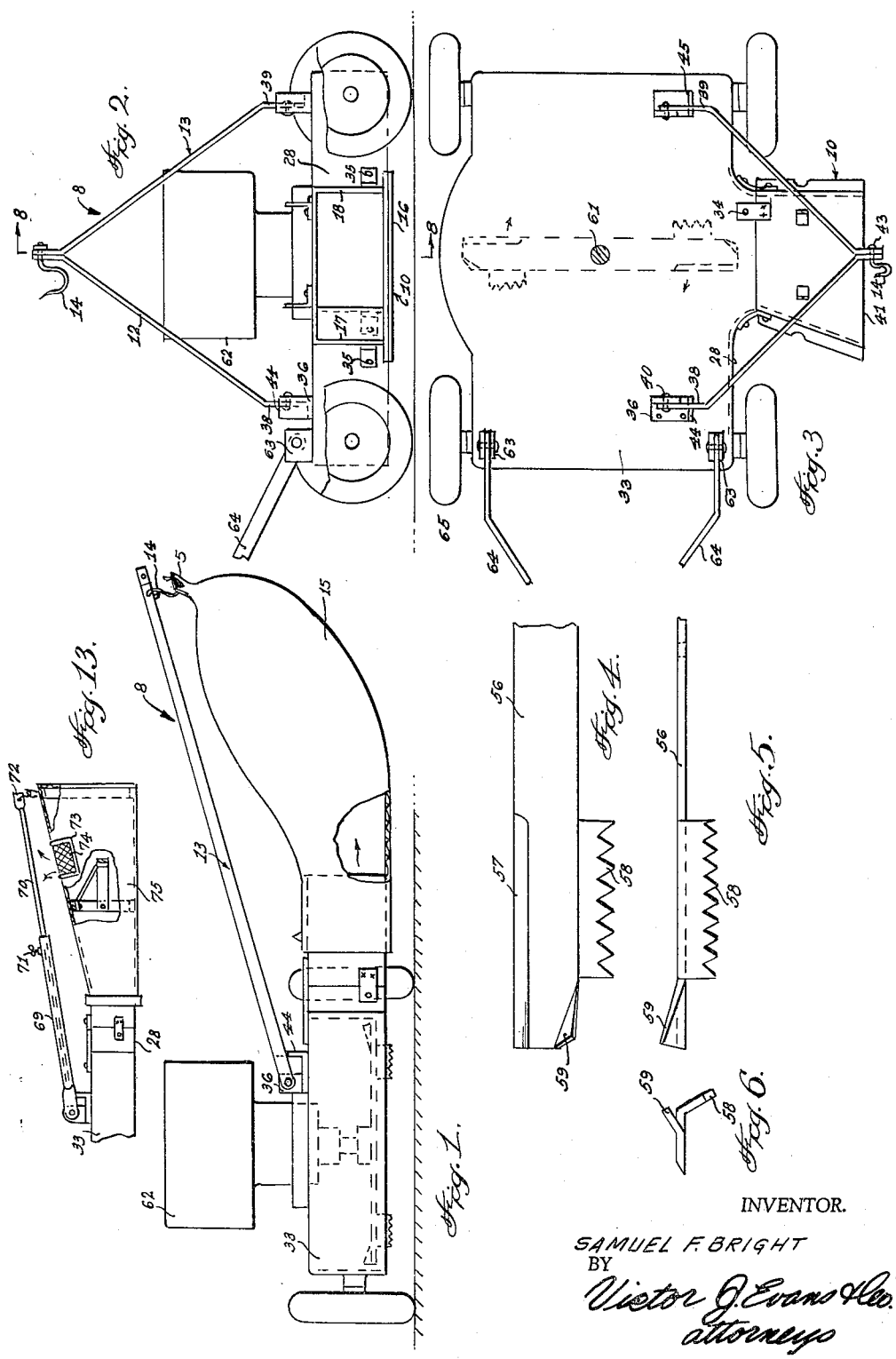
INVENTOR.
SAMUEL F. BRIGHT
BY
Victor J. Evans & Co.
attorneys Nov. 14, 1961 S. F. BRIGHT 3,008,284
GRASS RECOVERING ATTACHMENT FOR ROTARY MOWER
Filed June 16, 1959 2 Sheets-Sheet 2
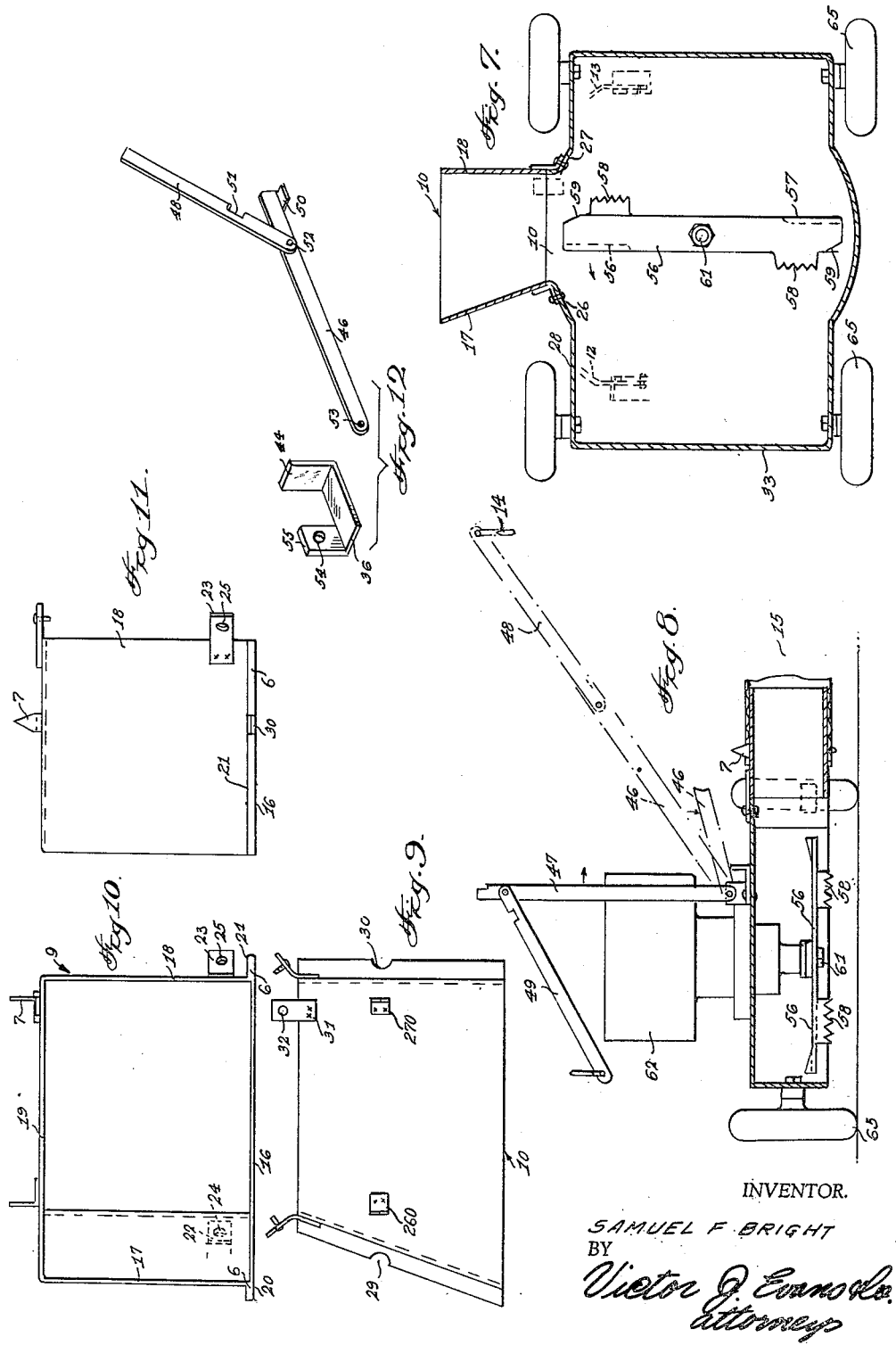
INVENTOR.
SAMUEL F. BRIGHT
BY
Victor J. Evans & Co.
Attorneys 0# United States Patent Office 3,008,284
Patented Nov. 14, 1961

3,008,284
GRASS RECOVERING ATTACHMENT FOR ROTARY MOWER
Samuel F. Bright, 809 N. 5th St., Ottumwa, Iowa
Filed June 16, 1959, Ser. No. 820,645
1 Claim. (Cl. 56—25.4)

This invention relates to lawn mowers of the rotary type, and in particular an attachment including a chute extended from the discharge side of the mower with a grass catching bag positioned with the entrance opening over the chute and with a support extended from the frame of the mower for suspending the bag in an extended position.

The purpose of this invention is to provide means for readily recovering cut grass discharged by a power mower whereby the grass may be carried to an incinerator or dump.

Various types of attachments have been provided for recovering clippings, leaves, and the like from the discharge side of power mowers, however, with conventional grass catching attachments of this type the attachment fills with grass rapidly with the result that numerous trips are required to carry the cut grass to a dump or the like. With this thought in mind this invention contemplates an attachment for a power mower in which cut grass, leaves, and the like are discharged through a chute into a relatively large bag suspended at one side of the mower whereby a comparatively large quantity of clippings may be recovered and retained in the bag before depositing the contents of the bag upon a dump or the like.

The object of this invention is, therefore, to provide means for suspending a relatively large bag at one side of a power mower for recovering clippings and the like discharged by the power mower.

Another object of the invention is to provide a grass recovering attachment for a power mower in which the attachment may be installed on mowers now in use, or the chute portion thereof made an integral part of the mower housing.

A further object of the invention is to provide an attachment for suspending a relatively large bag at one side of a power mower for recovering grass clippings, leaves, and the like discharged by the mower in which the assembly is of a simple and economical construction.

With these and other objects and advantages in view the invention embodies a chute secured by bolts to a side of a power mower with the chute positioned over a discharge opening of the mower and folding braces mounted on and extended upwardly from the housing of the mower for supporting a bag in position with the lower open end secured over the discharge end of the chute.

Other features and advantages of the invention will appear from the following description taken in connection with the drawings, wherein:

FIGURE 1 is a front elevational view partly broken away, showing a power mower with the attachment of this invention, including a grass receiving bag, extended from one side.

FIGURE 2 is a side elevational view of the power mower attachment showing the support for a grass receiving bag and with the grass receiving bag omitted.

FIGURE 3 is a plan view of the mower with the attachment extended from one side and also with the bag omitted.

FIGURE 4 is a fragmentary plan view illustrating the cutting end of one of the blades of the mower with the blade shown on an enlarged scale and with part of the blade broken away.

FIGURE 5 is an enlarged fragmentary side elevational view of the end of the blade, as shown in FIGURE 4 with raker teeth of the blade extended downwardly therefrom.

FIGURE 6 is a fragmentary end elevational view of the blade also showing the raker teeth extended downwardly therefrom and also with the parts shown on an enlarged scale.

FIGURE 7 is a view looking upwardly toward the under side of the mower showing a chute and the attachment extended from one side and with the bag and supporting means thereof omitted.

FIGURE 8 is a vertical sectional view of the power mower taken along the line 8—8 of FIG. 2 and showing one of the arms for supporting the cut grass receiving bag extended and showing another of said arms in the folded position.

FIGURE 9 is an enlarged plan view of a top plate of the chute through which grass and other products are discharged from the mower.

FIGURE 10 is an enlarged front elevational view looking toward the open end of the discharge chute through which cut grass is discharged from the mower.

FIGURE 11 is a view looking toward the rear end of the discharge chute.

FIGURE 12 is a view showing a clip for mounting the supporting arms of the grass receiving bag on the housing of the power mower also showing one of the folding arms, with the parts in an exploded view wherein the sections of the arm are separated from the mounting clip.

FIGURE 13 is a side elevational view partly broken away of the bag assembly illustrating a modification wherein the bag is supported by telescoping arms, and a vent is provided in the upper part.

Referring now to the drawings wherein like reference characters denote corresponding parts the improved cut grass recovering attachment for power mowers of this invention includes a chute 10 mounted over a discharge opening 11 of a power mower, a support 8 including arms 12 and 13 and a hook 14 and a bag 15 having an eye 5 at the upper end which is positioned on the hook 14.

The chute 10 includes a base plate 16 and a U-shaped cover 9 having end plates 17 and 18 and an upper panel 19, and the lower edges of the end plates 17 and 18 are provided with flanges 20 and 21 by which the cover 9 is secured to the base plate 16, the flanges 20 and 21 being secured to edges of the base plate by welding 6 or the like. The end plates 17 and 18 are provided with clip angles 22 and 23, respectively, and extended ends of the clip angles are provided with bolt holes 24 and 25 through which bolts extend for attaching the chute to arcuate edges 26 and 27 of the side wall 28 of the mower housing.

The top panel 19 of the chute is provided with clip angles 260 and 270, upwardly extended legs 7 of which are pointed to facilitate attaching the hem of the bag 15 to the chute and the clip angles 260 and 270 are in a vertical plane extended through the notches 29 and 30 and the notches and the pointed legs are positioned to receive a tieing cord for securing the open end of the bag over the end of the chute. The upper panel 19 is also provided with a bar 31 having an opening 32 therein and with the chute in position on the side of the housing of the mower a bolt may be extended through the opening 32 and also through a similar opening in the cover plate 33 of the mower housing whereby the chute may be secured to the housing by a bolt 34 and also by bolts 35 in the clips 22 and 23 on the end walls 17 and 18.

The upper surface of the cover panel 33 of the power mower is also provided with clip angles 36 and 37 upon which straight ends 38 and 39 of the upper bars 12 and 13 are pivotally mounted by bolts 40, and ends 41 and 42 extended from upper ends of the arms or bars 12 and 13 are provided with openings in which the shank 43 of the hook 14 is positioned. The clip angles 36 and 37 are also provided with stops 44 and 45 which, as illustrated in FIGURE 1, hold the arms or bars in upwardly extended positions so that the bag is suspended in a clipping receiving position.

The arms of bars 12 and 13, in FIGS. 8 and 12, are provided with lower sections 46 and 47 and upper sections 48 and 49 and the lower sections 46 and 47 are provided with flanges 50 that are positioned to register with notches 51 in the sections 48 and 49 whereby with the sections 48 and 49 pivotally connected to the sections 46 and 47 by pins 52 downward movement of the upper sections 48 and 49 is limited to the position shown in FIGURES 1 and 8. The lower ends of the sections 46 and 47 of the arms are provided with openings 53 that are aligned with openings 54 in the upwardly extended tabs 55 of the clip angles 36 and 37 and the sections 46 are secured to the tabs 55 by the bolts 40.

The mower is provided with cutting blades 56 having sharp beveled edges 57 and also having downwardly extended teeth 58 which function as raker teeth carrying the cut grass to the discharge opening of the mower. The ends of the blades are provided with upwardly inclined fan sections 59 which cause rapid circulation of air through the motor housing whereby the cut grass is discharged through the chute 10 at relatively high speed. The fan blades are provided with openings 60 by which they are secured to a motor shaft 61 extended through the cover plate 33 of the motor housing and connected to a shaft of a motor 62.

The power mower housing is also provided with bearings 63 from which arms 64 of a handle extend and the housing is mounted on wheels 65.

The supporting arms 12 and 13 may be made of hinged or folding straps, or the bag may be supported by telescoping arms formed with sections 69 and 70, as shown in FIGURE 13, whereby the arms are adjustable to hold bags of different sizes. The section 69 is provided with a thumb screw 71 to secure the rods in adjusted positions, and the section 70 is provided with an eye 72 to which the end of the bag is fastened.

*Operation*

The parts are assembled with the bag 15 suspended from the arms 12 and 13 and with the open end of the bag secured over the open end of the chute 10 and as grass is cut by the blades it is discharged through the chute and into the bag 15 with cut grass, leaves, and other debris accumulating in the bag.

The bag may be made of any canvas, or other porous material and the open end of the bag may be secured over the discharge of the power mower by other means.

It will be understood that modifications, within the scope of the appended claim, may be made in the design and arrangement of the parts without departing from the spirit of the invention.

What is claimed is:

In a cut grass recovering attachment for a power mower, having a housing provided with a depending peripheral vertically disposed wall provided with a discharge opening therein, the combination which comprises a chute having diverging end walls, an inner end and an outer end, the inner end of said chute being detachably connected to the wall of the mower and positioned over the discharge opening therein, collapsible arms pivotally mounted on the upper surface of the mower and extended diagonally upward therefrom, stops for supporting the arms in upwardly disposed positions, a hook carried by upper ends of the arms, a bag having an open end and a closed end, said bag being suspended at the closed end from the hook and positioned with the open end over the large end of the chute, and means on the chute for temporarily retaining the open end of the bag on the chute.

References Cited in the file of this patent

UNITED STATES PATENTS

| | | |
|---|---|---|
| 2,203,198 | Jungle | June 4, 1940 |
| 2,571,455 | Keiper | Oct. 16, 1951 |
| 2,641,100 | Sylvester | June 9, 1953 |
| 2,783,604 | Cahill | Mar. 5, 1957 |
| 2,830,428 | Speegle | Apr. 15, 1958 |
| 2,836,021 | Wood et al. | May 27, 1958 |
| 2,863,162 | Draughon | Dec. 9, 1958 |
| 2,932,146 | Campbell | Apr. 12, 1960 |